United States Patent Office
3,814,744
Patented June 4, 1974

3,814,744
PROCESS FOR PRODUCING BUTADIENE POLYMER
Yoshiharu Yagi, Toyonaka, Shizuo Narisawa and Takao Oshima, Ibaragi, and Kazuhiko Hata, Takatsuki, Japan, assignors to Sumitomo Chemical Company, Limited
No Drawing. Filed Sept. 21, 1971, Ser. No. 182,536
Claims priority, application Japan, Sept. 24, 1970, 45/84,377; Oct. 17, 1970, 45/91,355
Int. Cl. C08d 1/14, 3/06
U.S. Cl. 260—94.3
13 Claims

ABSTRACT OF THE DISCLOSURE

A process for producing butadiene polymer which comprises polymerizing 1,3-butadiene in the presence of a catalyst system consisting of (A) at least one of nickel compounds, (B) at least one of trialkyl aluminum compounds, (C) at least one of benzotrifluoride compounds of the formula:

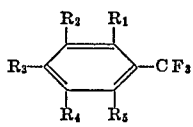

wherein $R_1$, $R_2$, $R_3$, $R_4$ and $R_5$ are each a hydrogen atom, a halogen atom, an alkyl group or a fluoroalkyl group and (D) at least one carboxylic compound selected from the group consisting of carboxylic acids of the formula:

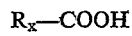

$$R_x\text{—COOH}$$

wherein $R_x$ is a chlorinated or fluorinated alkyl group, carboxylic acid esters of the formula:

$$R_x\text{—COOR}$$

wherein R is a hydrocarbon group or a halogenated hydrocarbon group and $R_x$ is as defined above, carboxylic acid anhydrides of the formula:

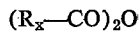

$$(R_x\text{—CO})_2O$$

wherein $R_x$ is as defined above, alkylaluminum carboxylates of the formula:

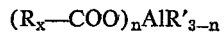

$$(R_x\text{—COO})_n AlR'_{3-n}$$

wherein R' is an alkyl group, $n$ is an integer not more than 3 and $R_x$ is as defined above and hydroquinone carboxylates of the formula:

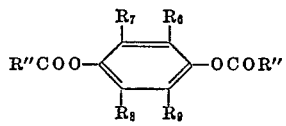

wherein $R_6$, $R_7$, $R_8$ and $R_9$ are each a hydrogen atom or a halogen atom and R'' is a hydrocarbon group or a halogenated hydrocarbon group with or without (E) water to give a butadiene polymer containing predominantly cis-1,4-structure.

The present invention relates to a process for producing butadiene polymer. More particularly, it relates to a process for producing butadiene polymer containing predominantly cis-1,4-structure by polymerization of 1,3-butadiene in the presence of a novel catalyst system.

In this specification, the term "alkyl" is preferred to be lower alkyl having 1 to 6 carbon atoms and the term "halogen" is intended to cover four kinds of halogen atoms, i.e. chlorine, bromine, iodine and fluorine.

For production of butadiene polymer of cis-1,4-structure, there have been known a variety of catalyst systems, of which typical examples are as follows: (1) a composition comprising a halogenated titanium compound and a trialkyl aluminum; (2) a composition comprising a halogenated cobalt compound and an alkyl aluminum halide, and (3) a composition comprising a nickel compound, a trialkyl aluminum and a Lewis acid such as an inorganic halogenated compound.

Among them, the said composition (3) comprising a nickel compound has been highly evaluated due to its high catalytic activity and various advantages on its practical use.

It has now been found that the polymerization of 1,3-butadiene can be advantageously effected, affording butadiene polymer containing predominantly cis-1,4-structure, by the use of a novel catalyst system comprising a nickel compound.

According to the present invention, 1,3-butadiene is polymerized in the presence of a catalyst system consisting of (A) at least one of nickel compounds, (B) at least one of trialkyl aluminum compounds, (C) at least one of benzotrifluoride compounds of the formula:

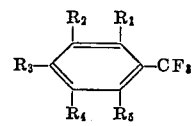

[I]

wherein $R_1$, $R_2$, $R_3$, $R_4$ and $R_5$ are each a hydrogen atom, a halogen atom, an alkyl group or a fluoroalkyl group and (D) at least one carboxylic compound selected from the group consisting of carboxylic acids of the formula:

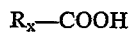

$$R_x\text{—COOH} \quad [II]$$

where $R_x$ is a chlorinated or fluorinated alkyl group, carboxylic acid esters of the formula:

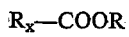

$$R_x\text{—COOR} \quad [III]$$

wherein R is a hydrocarbon group such as alkyl or a halogenated hydrocarbon group such as halogenated alkyl and $R_x$ is as defined above, carboxylic acid anhydrides of the formula:

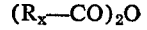

$$(R_x\text{—CO})_2O \quad [IV]$$

wherein $R_x$ is as defined above, alkylaluminum carboxylates of the formula:

$$(R_x\text{—COO})_n AlR'_{3-n} \quad [V]$$

wherein R' is an alkyl group, $n$ is an integer not more than 3 and $R_x$ is as defined above and hydroquinone carboxylates of the formula:

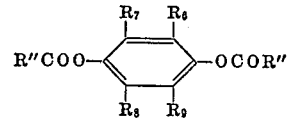

[VI]

wherein $R_6$, $R_7$, $R_8$ and $R_9$ are each a hydrogen atom or a halogen atom and R'' is a hydrocarbon group such as alkyl or a halogenated hydrocarbon group such as halogenated alkyl with or without (E) water whereby a butadiene polymer containing predominantly cis-1,4-structure is produced.

Among the carboxylic compounds as the component (D), trichloroacetic acid, trifluoroacetic acid and the like have heretofore been used in a catalyst system for production of polybutadiene. For example, a catalyst system comprising π-crotyl nickel chloride and trifluoroacetic acid [U.S. Pat. 3,468,866] and a catalyst system comprising bis(cyclooctadiene)nickel and trichloroacetic acid or trifluoroacetic acid [U.S. Pat. 3,497,488] are known. The catalyst system of the present invention is more advantageous than those known catalyst systems in the ready availability of the component materials used therefor and the high and stable catalytic activity under various conditions including the presence of water.

As the nickel compounds, there may be employed the one(s) selected from various salts and organic complex compounds of nickel such as nickel halides (e.g. nickel chloride), nickel sulfate, organic acid salts of nickel (e.g. nickel acetate, nickel naphthenate, nickel octanoate), complex compounds of nickel salts (e.g. nickel chloride-pyridine complex, tris(dipyridyl)nickel chloride, bis(ethylenediamine)nickel sulfate) and organic coordination compounds of nickel or nickel chelate compounds (e.g. bis-dimethylglyoxymato nickel, bis-ethylacetoacetate nickel, bis-acetylacetonate nickel).

Examples of the trialkyl aluminum compound include trimethyl aluminum, triethyl aluminum, tri-n-butyl aluminum, triisobutyl aluminum and tri-n-hexyl aluminum.

Examples of the benzotrifluoride compound [I] are benzotrifluoride,
2-chlorobenzotrifluoride,
3-chlorobenzotrifluoride,
4-chlorobenzotrifluoride,
2-bromobenzotrifluoride,
3-bromobenzotrifluoride,
4-bromobenzotrifluoride,
2,5-dichlorobenzotrifluoride,
3,4-dichlorobenzotrifluoride,
2,3-dibromobenzotrifluoride,
2,5-difluorobenzotrifluoride,
3,5-difluorobenzotrifluoride,
2-methylbenzotrifluoride,
3-methylbenzotrifluoride,
4-methylbenzotrifluoride,
2-hexylbenzotrifluoride,
4-hexylbenzotrifluoride,
2-dodecylbenzotrifluoride,
4-dodecylbenzotrifluoride,
2-monofluoromethylbenzotrifluoride,
3-difluoromethylbenzotrifluoride,
1,3-bis(trifluoromethyl)benzene,
3-(3'-fluoropropyl)benzotrifluoride,
4-(2',3'-difluoropropyl)benzotrifluoride,
1,3,5-tris(trifluoromethyl)benzene,
2-methyl-4-chlorobenzotrifluoride,
3-bromo-4-ethylbenzotrifluoride,
2-methyl-4-trifluoromethylbenzotrifluoride,
3-fluoro-4-trifluoromethylbenzotrifluoride, etc.

As the carboxylic acid [II], there may be exemplified trichloroacetic acid,
difluoroacetic acid,
2,2,3,3-tetrafluoropropionic acid,
2,2,3,3,4,4,5,5-octafluoro-n-valeric acid,
2,2,3,3,4,4,5,5,6,6,7,7-dodecafluoroheptanoic acid,
trifluoroacetic acid,
perfluoropropionic acid,
perfluoro-n-butyric acid,
perfluoroisobutyric acid,
perfluoro-n-valeric acid,
perfluorocaproic acid,
perfluoroheptanoic acid,
perfluorocapric acid, etc.

The carboxylic acid ester [III] may be the ester (e.g. methyl, ethyl, n-propyl, isopropyl, n-butyl, sec-butyl, n-octyl, n-dodecyl, trifluoroethyl, tetrafluoropropyl, pentafluoropropyl, phenyl, 2-chlorophenyl, 3-chlorophenyl, 4-chlorophenyl, 2-fluorophenyl, 3-fluorophenyl, 4-fluorophenyl, 3-chloro-4-fluorophenyl, 2,4-difluorophenyl, pentachlorophenyl, pentafluorophenyl, 3-trifluoromethylphenyl, 4-trifluoromethylphenyl esters) of the carboxylic acid as exemplified above.

The carboxylic anhydride [IV] may be the one corresponding to the carboxylic acid as exemplified above.

The alkyl aluminum carboxylate [V] can be readily prepared by a conventional procedure, e.g. reacting the carboxylic acid [II] with trialkyl aluminum in an appropriate inert solvent (e.g. hydrocarbon). The reaction is representable by the formula:

$$nR_xCOOH + AlR_3 \rightarrow (R_xCOO)_nAlR_{3-n} + nRH$$

Examples of the hydroquinone carboxylate [VI] include the acetate, propionate, benzoate, monofluoroacetate, trifluoroacetate, tetrafluoropropionate, 4-fluorobenzoate and 4-chlorobenzoate of tetrachlorohydroquinone, tetrafluorohydroquinone, tetrabromohydroquinone, 2,5-dichlorohydroquinone and 2,3,5-trichlorohydroquinone.

The catalytic activity of the catalyst system of the present invention is varied depending on the mixing ratio of the components, the mixing order of the components, the temperature during the preparation of the catalyst system and the like. Of these, the mixing ratio of the components has particularly a great influence on the catalytic activity. The molar ratios of the nickel compound to the trialkyl aluminum compound (i.e. (A)/(B)), the trialkyl aluminum compound to the benzotrifluoride compound [I] (i.e. (B)/(C)) and the carboxylic compounds [II] to [VI] to the nickel compound (i.e. (D)/(A)) may vary in the range from 0.001 to 2 (preferably 0.01 to 1), 0.01 to 5.0 (preferably 0.1 to 3) and 0.01 to 100 (preferably 0.1 to 10), respectively.

When water is incorporated, the molar ratio of water to the trialkyl aluminum compound (i.e. (E)/(B)) is 0.05 to 1.5 (preferably 0.1 to 1.2).

Further, the nickel compound may be used in an amount of 0.001 to 2 mmol, preferably in the amount of 0.01 to 1 mmol, based on 1 mol of monomer in 1,3-butadiene. When the amount of any one of the components (A), (B), (C) or (D) is too large or small, the catalytic activity of the resultant catalyst system is extremely lowered or lost. That is, the high catalytic activity can be surely obtained only when the said mixing ratio is employed. In case that the components (C) and (D) are not present in the catalyst system, the catalytic activity is hardly exhibited.

The mixing of each of the components for preparation of the catalyst system can be accomplished in any optional order and is ordinarily carried out in the presence of a diluent. For obtaining the catalyst system with a higher activity, the nickel compound and the trialkyl aluminum compound may be allowed to contact each other in the presence of a small amount of an aliphatic conjugated diene (e.g. 1,3-butadiene, isoprene, dimethylbutadiene). Such technique will prevent the formation of insoluble material during the preparation and can thus minimize the harmful influence caused by contamination with a small amount of impurity in the polymerization reaction system.

The preparation of the catalyst system is executed at a temperature from $-80$ to $100°$ C., preferably from $-20$ to $50°$ C. In order to obtain the catalyst system of an enhanced catalytic activity, it is favorable that, prior to admixing with the other components, the trialkyl aluminum compound and the benzotrifluoride compound [I] are reacted to a certain extent by heating at a temperature from 30 to $150°$ C. It is also favorable that, after all of the components are mixed completely, the resultant mixture is aged at a temperature from 0 to $100°$ C.

A typical example of the concrete procedures for preparation of the catalyst system of the invention is as follows: admixing the trialkyl aluminum compound with the benzotrifluoride [I] in a diluent, heating the resultant mixture at an appropriate temperature and then cooling it to around $0°$ C. adding thereto a small amount of 1,3-butadiene, adding further the nickel compound and the carboxylic compound in this order or in the reversed order and finally aging the resulting mixture at an appropriate temperature. Another typical example is as follows: dissolving or suspending the nickel compound and the carboxylic compound in a diluent, adding a small amount of 1,3-butadiene thereto while cooling in an ice bath, adding further the trialkyl aluminum compound and the benzotrifluoride compound [I] thereto and finally aging the resultant mixture at an appropriate temperature.

The incorporation of water into the catalyst system may be effected at any step during its preparation. That is, a part or whole of the desired amount of water may be presented in any one or all of the nickel compound, the trialkyl aluminum compound, the benzotrifluoride compound [I] and the carboxylic compound, or their mixtures. Alternatively, water may be incorporated into the polymerization reaction system by way of absorption into 1,3-butadiene as well as admixture with a diluent to be applied as the reaction medium for the polymerization or by adding it to a whole mixture of the catalyst system, 1,3-butadiene and a diluent prior to or during the polymerization.

In the polymerization of 1,3-butadiene according to the present invention, the molecular weight of the produced polymer can be intentionally regulated by varying the composition of the catalyst system, the conditions of the preparation of the catalyst system (e.g. temperature) and the polymerization conditions (e.g. concentration of the catalyst system, concentration of the monomers, temperature, etc.).

The polymerization reaction is effected under the environment substantially free from any inhibitive material which is occasionally encountered with the generally accepted Ziegler-Natta type catalysts. In general, when a Ziegler-Natta type catalyst comprising trialkyl aluminum is employed, the polymerization reaction must be performed under the environment completely free from water, because the presence of water prevents the polymerization or retards the polymerization rate. On the contrary, in the polymerization using the catalyst system of the invention, the incorporation of water rather increases the polymerization rate in spite of the presence of the trialkyl aluminum compound. Further, the molecular weight of the produced polymer can be regulated by varying the water content.

Examples of the solvent as the diluent for the catalyst system and/or as the reaction medium for the polymerization include aromatic hydrocarbons (e.g. benzene, toluene, xylene), aliphatic hydrocarbons (e.g. pentane, hexane, heptane, octane), alicyclic hydrocarbons (e.g. cyclohexane, methylcyclohexane, decalin), etc.

The polymerization is carried out by contacting 1,3-butadiene with the catalyst system in a liquid medium at a temperature from −20 to 150° C., preferably from 0 to 100° C. under the stream of an inert gas (e.g. nitrogen, argon, helium). The catalyst system and 1,3-butadiene may be supplied to the reaction system in an optional order in the presence or absence of the liquid medium.

The recovery of the produced polymer from the reaction mixture may be performed in a per se conventional manner. For instance, the reaction mixture is poured into a large amount of aqueous or alcoholic medium such as methanol, isopropanol, methanol-acetone or hot water, if necessary, with previous addition of an antioxidant (e.g. phenol-β-naphthylamine, 2,6-di-tert-butyl-p-cresol), and then the precipitate is collected and washed with methanol to obtain a substantially colorless rubber-like polymer.

The butadiene polymer produced by the present invention is a rubber-like solid or highly viscous material. The analysis of the micro structure according to the infrared absorption method reveals the presence of cis-1,4 structure in most butadiene units.

Practical and presently preferred embodiments of the present invention are illustratively shown in the following Examples wherein the intrinsic viscosity of the polymer is measured on the toluene solution at 30° C. and the micro structure of the polymer is determined from the infrared absorption spectrum according to the Morero's method [D. Morero et al.: Chim. e Ind., 41, 758 (1959)].

EXAMPLE 1

In a glass made reaction tube, a solution of triethyl aluminum (8 mmol) and benzotrifluoride (6 mmol) in toluene (40 ml.) is heated at a temperature around the boiling point of toluene for 30 minutes. A solution of butadiene (5.4 g.) in toluene (58 ml.) and a solution of nickel naphthenate (1.33 mmol) in toluene (13.3 ml.) are added thereto in this order, and the resulting mixture is stirred at 25° C. for 35 minutes. A part of the mixture (10 ml.) is taken out and charged into a 200 ml. volume glass made pressure polymerization tube. A toluene solution of the component (D) is added thereto, and the resultant mixture is aged at 40° C. for 15 minutes. Toluene is added thereto to make 100 ml. After the mixture is cooled below −20° C., 1,3-butadiene (22 g.) is added, and the polymerization tube is sealed. In the foregoing procedure, the whole operations are effected in an argon stream. The polymerization tube is placed into a rotary constant temperature bath of 40° C., and polymerization is executed for a designed time. Then, the reaction mixture is poured into methanol containing a small amount of 2,6-di-t-butyl-p-cresol to cease the polymerization whereby the polymer is precipitated. The polymer is separated and dried at room temperature in vacuo.

The yield and the physical properties of the produced polymer are shown in Table 1.

TABLE 1

| Number | Component (D) Kind | Amount [1] | Polymerization time (hrs.) | Polymerization product | | | | |
|---|---|---|---|---|---|---|---|---|
| | | | | Yield (percent) | [η] (dl./g.) | Micro structure (percent) | | |
| | | | | | | Cis-1,4 | Trans-1,4 | 1,2 |
| 1 | Trifluoroacetic acid | 2.0 | 40 | 37.2 | 0.70 | 90.5 | 5.2 | 4.3 |
| 2 | Trichloroacetic acid | 2.0 | 40 | 48.2 | 0.40 | 76.9 | 20.5 | 2.6 |
| 3 | Trifluoroacetic anhydride | 2.0 | 40 | 19.6 | 1.00 | 91.5 | 4.5 | 4.0 |
| 4 | Perfluoropropionic acid | 2.0 | 40 | 33.2 | 0.66 | 90.4 | 5.4 | 4.2 |
| 5 | 2,2,3,3-tetrafluoropropionic acid | 2.0 | 40 | 29.8 | 0.58 | 90.9 | 5.3 | 3.8 |
| 6 | 4-chlorophenyl trifluoroacetate | 2.0 | 40 | 30.7 | 1.29 | 93.7 | 3.3 | 3.0 |
| 7 | Pentachlorophenyl trichloroacetate | 2.0 | 40 | 100 | | 74.1 | 23.6 | 2.3 |
| 8 | Not added | | 40 | Trace | | | | |

[1] The molar ratio to 0.12 mmol of nickel naphthenate.

REFERENCE EXAMPLE 1

In a glass made reaction tube, there are charged a solution of triethyl aluminum (7.2 mmol) in toluene (68 ml.), a solution of 1,3-butadiene (4.8 g.) in toluene (20 ml.) and a solution of nickel naphthenate (1.2 mmol) in toluene (12 ml.), and the contents are stirred at 25° C. for 225 minutes. A part of the mixture (10 ml.) is taken out and charged into a 200 ml. volume glass made pressure polymerization tube. A toluene solution of the component (D) is added thereto, and the resultant mixture is aged at 40° C. for 15 minutes. Toluene is added thereto to make 100 ml. After the mixture is cooled below −2° C., 1,3-butadiene (22 g.) is added, and the polymerization tube is sealed. In the foregoing procedure, the whole operations are effected in an argon stream. The polymerization tube is placed into a rotary constant temperature bath of 40° C., and polymerization is executed for a designed time. Then, the reaction mixture is poured into methanol containing a small amount of 2,6-di-t-butyl-p-cresol to cease the polymerization whereby the polymer is precipitated.

The yield and the physical properties of the produced polymer are shown in Table 2.

toluene (12 ml.), and the contents are stirred at 25° C. for 30 minutes. A part of the mixture (10 ml.) is taken

TABLE 2

| Number | Component (D) Kind | Amount[1] | Polymerization time (hrs.) | Polymerization product | | | | |
|---|---|---|---|---|---|---|---|---|
| | | | | Yield (percent) | $[\eta]$ (dl./g.) | Micro structure (percent) | | |
| | | | | | | Cis-1,4 | Trans-1,4 | 1,2 |
| 1 | Trifluoroacetic acid | 2.0 | 40 | 6.5 | 0.81 | 88.6 | 6.1 | 5.3 |
| 2 | Trifluoroacetic anhydride | 2.0 | 40 | Trace | | | | |
| 3 | Pentachlorophenyl trichloroacetate | 2.0 | 40 | 52.1 | | 58.5 | 40.8 | 0.7 |
| 4 | Not added | | 40 | 0 | | | | |

[1] The molar ratio to 0.12 mmol of nickel naphthenate.

EXAMPLE 2

In a glass made reaction tube, a solution of triethyl aluminum (4 mmol) and benzotrifluoride (4 mmol) in toluene (20 ml.) is heated at a temperature around the boiling point of toluene for 30 minutes. A solution of 1,3-butadiene (2.4 g.) in toluene (74 ml.) and a solution of nickel naphthenate (0.6 mmol) in toluene (6 ml.) are added thereto in this order, and the resulting mixture is stirred at 25° C. for 30 minutes. A part of the mixture (10 ml.) is taken out and charged into a 200 ml. volume glass made pressure polymerization tube. Toluene (15.4 ml.) containing 417 p.p.m. of water is added thereto, and then a toluene solution of the component (D) is added. The resultant mixture is aged at 25° C. for 30 minutes. Toluene is added thereto to make 130 ml. After the mixture is cooled below —20° C., 1,3-butadiene (22 g.) is added, and the polymerization tube is sealed. In the foregoing procedure, the whole operations are effected in an argon stream. The polymerization tube is placed into a rotary constant temperature bath of 40° C., and polymerization is executed for a designed time. Then, the reaction mixture is poured into methanol containing a small amount of 2,6-di-t-butyl-p-cresol to cease the polymerization whereby the polymer is precipitated. The polymer is separated and dried at room temperature in vacuo.

The yield and the physical properties of the produced polymer as shown in Table 3.

out and charged into a 200 ml. volume glass made pressure polymerization tube. Moistened toluene is added thereto, and then a toluene solution of the component (D) is added. The resultant mixture is aged at 40° C. for 15 minutes. Toluene is added thereto to make 100 ml. After the mixture is cooled below —20° C., 1,3-butadiene (22 g.) is added, and the polymerization tube is sealed. In the foregoing procedure, the whole operations are effected in an argon stream. The polymerization tube is placed into a rotary constant temperature bath of 40° C., and polymerization is executed for a designed time. Then, the reaction mixture is poured into methanol containing a small amount of 2,6-di-t-butyl-p-cresol to cease the polymerization whereby the polymer is precipitated.

The yield and the physical properties of the produced polymer as shown in Table 4.

TABLE 4

| Number | Component (D) Kind | Amount[1] | Amount of water[2] | Polymerization time (hrs.) | Polymerization product | | | | |
|---|---|---|---|---|---|---|---|---|---|
| | | | | | Yield (percent) | $[\eta]$ (dl./g.) | Micro structure | | |
| | | | | | | | Cis-1,4 | Trans-1,4 | 1,2 |
| 1 | Trifluoroacetic acid | 1.0 | 0.4 | 40 | 19.3 | 0.69 | 94.8 | 2.1 | 3.1 |
| 2 | 4-chlorophenyl trifluoroacetate | 1.0 | 0.4 | 50 | 15.0 | 0.60 | 93.8 | 2.6 | 3.6 |
| 3 | Not added | | 0.4 | 50 | Trace | | | | |

[1] The molar ratio to 0.12 mmol of nickel naphthenate.  [2] The molar ratio to 0.8 mmol of triethyl aluminum.

Comparing Examples 1 and 2 respectively with Reference Examples 1 and 2, it is apparent that the presence of benzotrifluoride (i.e. the component (C)) in the catalyst system affords good results.

EXAMPLE 3

The preparation of a catalyst composition and the polymerizatoin of 1,3-butadiene by the use of the obtained catalyst composition are executed in the same manner as in Example 2 except that the amounts of nickel naph-

TABLE 3

| Number | Component (D) Kind | Amount[1] | Amount of water[2] | Polymerization time (min.) | Polymerization product | | | | |
|---|---|---|---|---|---|---|---|---|---|
| | | | | | Yield (percent) | $[\eta]$ (dl./g.) | Micro structure (percent) | | |
| | | | | | | | Cis-1,4 | Trans-1,4 | 1,2 |
| 1 | Trifluoroacetic acid | 1.0 | 0.8 | 240 | 78.4 | 3.38 | 96.5 | 1.3 | 2.2 |
| 2 | do | 2.0 | 0.8 | 240 | 84.8 | 2.48 | 96.6 | 1.2 | 2.2 |
| 3 | Perfluoropropionic acid | 1.0 | 0.8 | 240 | 76.0 | 3.35 | 96.3 | 1.4 | 2.3 |
| 4 | Perfluoro-n-butyric acid | 1.0 | 0.8 | 240 | 66.0 | 3.73 | 96.3 | 1.4 | 2.3 |
| 5 | 2,2,3,3-tetrafluoropropionic acid | 1.0 | 0.8 | 240 | 72.0 | 3.21 | 96.2 | 1.5 | 2.3 |
| 6 | Trifluoroacetic anhydride | 1.0 | 0.8 | 240 | 80.5 | 3.38 | 96.3 | 1.4 | 2.3 |
| 7 | Perfluoro-n-butyric anhydride | 1.0 | 0.8 | 240 | 76.6 | 2.48 | 95.8 | 1.7 | 2.5 |
| 8 | Ethyl trifluoroacetate | 1.0 | 0.8 | 240 | 65.0 | 4.10 | 96.3 | 1.5 | 2.2 |
| 9 | Tetrachlorohydroquinone diacetate | 1.0 | 0.8 | 300 | 62.3 | 4.22 | 96.8 | 1.2 | 2.0 |
| 10 | Not added[3] | | 0.8 | 300 | 0 | | | | |

[1] The molar ratio to 0.06 mmol of nickel napthenate.  [2] The molar ratio to 0.4 mmol of triethyl aluminium.  [3] Benzotrifluoride is not added.

REFERENCE EXAMPLE 2

In a glass made reaction tube, there are charged a solution of triethyl aluminum (8 mmol) in toluene (68 ml.), a solution of 1,3-butadiene (4.8 g.) in toluene (20 ml.) and a solution of nickel naphthenate (1.2 mmol) in thenate, triethyl aluminum and benzotrifluoride are changed respectively to 0.04 mmol, 0.4 mmol and 0.3 mmol and the aging of the catalyst composition is performel at 40° C. for 15 minutes.

The results are shown in Table 5.

into a 200 ml. volume glass made pressure polymeriza-

TABLE 5

| Number | Component (D) Kind | Amount[1] | Amount of water[2] | Polymerization time(min.) | Polymerization product | | | | |
|---|---|---|---|---|---|---|---|---|---|
| | | | | | Yield (percent) | [η] (dl./g.) | Micro structure (percent) | | |
| | | | | | | | Cis-1,4 | Trans-1,4 | 1,2 |
| 1 | Trichloroacetic acid | 1.0 | 0.8 | 360 | 33.4 | 3.80 | 96.8 | 1.0 | 2.2 |
| 2 | Trifluoroacetic acid | 1.0 | 0.8 | 150 | 70.1 | 2.98 | 96.6 | 1.2 | 2.2 |
| 3 | Ethyl trifluoroacetate | 1.0 | 0.8 | 150 | 70.8 | 3.12 | 96.5 | 1.3 | 2.2 |
| 4 | Pentachlorophenyl trichloroacetate | 1.0 | 0.8 | 360 | 50.2 | 3.44 | 95.4 | 1.5 | 3.0 |
| 5 | 4-chlorophenyl trifluoroacetate | 1.0 | 0.8 | 180 | 80.0 | 3.00 | 96.6 | 1.1 | 2.3 |
| 6 | Tetrachlorohydroquinone dibenzoate | 1.0 | 0.8 | 150 | 77.6 | 3.13 | 96.0 | 1.6 | 2.4 |
| 7 | do | 0.5 | 0.8 | 150 | 73.1 | 3.14 | 96.1 | 1.6 | 2.3 |
| 8 | Trifluoroacetic acid plus ethyl trifluoroacetate | 1.0 | 0.8 | 150 | 73.0 | 2.97 | 96.6 | 1.2 | 2.2 |

[1] The molar ratio to 0.04 mmol of nickel naphthenate; No. 8, exeptionally using trifluoroacetic acid (0.02 mmol) plus ethyl trifluoroacetate (0.02 mmol).
[2] The molar ratio to 0.4 mmol of triethyl aluminum.

EXAMPLE 4

The preparation of a catalyst composition and the polymerization of 1,3-butadiene by the use of the obtained catalyst composition are executed in the same manner as in Example 2 except that the amounts of nickel naphthenate and triethyl aluminum are changed respectively to 0.04 mmol and 0.4 mmol, benzotrifluoride (4 mmol) is replaced by 3-chlorobenzotrifluoride (0.4 mmol) and the aging of the catalyst composition is performed at 40° C. for 15 minutes.

The results are shown in Table 6.

tion tube. Moistened toluene and a toluene solution prepared by reacting triethyl aluminum (4 mmol) and trifluoroacetic acid (1.6 mmol) in toluene and adjusting the volume to 100 ml. are added thereto, and the resulting mixture is aged at 40° C. for 15 minutes.

The polymerization is carried out as in Example 2 using the above obtained catalyst composition.

The results are shown in Table 7.

TABLE 7

| Number | Reaction mixture of triethyl aluminum of trifluoroacetic acid (ml.) | Molar ratio of— | | Polymerization time (min.) | Polymerization product | | | | |
|---|---|---|---|---|---|---|---|---|---|
| | | Trifluoroacetic acid to nickel | Water to triethyl aluminum | | Yield (percent) | [η] (dl./g.) | Micro structure (percent) | | |
| | | | | | | | Cis-1,4 | Trans-1,4 | 1,2 |
| 1 | 2.0 | 3.2/4 | 0.6 | 150 | 83.0 | 2.42 | 96.2 | 1.5 | 2.3 |
| 2 | 2.0 | 3.2/4 | 0.8 | 150 | 72.4 | 2.99 | 96.0 | 1.5 | 2.5 |
| 3 | 4.0 | 6.4/4 | 0.6 | 150 | 72.8 | 1.90 | 96.3 | 1.4 | 2.3 |
| 4 | 4.0 | 6.4/4 | 0.8 | 150 | 73.1 | 2.81 | 96.3 | 1.4 | 2.3 |

EXAMPLE 6

The preparation of a catalyst composition and the polymerization of 1,3-butadiene by the use of the above

TABLE 6

| Number | Component (D) Kind | Amount[1] | Amount of water[2] | Polymerization time(min.) | Polymerization product | | | | |
|---|---|---|---|---|---|---|---|---|---|
| | | | | | Yield (percent) | [η] (dl./g.) | Micro structure (percent) | | |
| | | | | | | | Cis-1,4 | Trans-1,4 | 1,2 |
| 1 | Trifluoroacetic acid | 1.0 | 0.8 | 270 | 67.9 | 3.04 | 96.4 | 1.3 | 2.2 |
| 2 | Trifluoroacetic anhydride | 1.0 | 0.8 | 270 | 57.3 | 3.26 | 96.5 | 1.2 | 2.3 |
| 3 | Ethyl trifluoroacetate | 1.0 | 0.8 | 270 | 59.3 | 3.72 | 97.3 | 1.1 | 1.7 |
| 4 | Tetrachlorohydroquinone diacetate | 1.0 | 0.8 | 270 | 55.5 | 3.77 | 96.8 | 1.1 | 2.1 |
| 5 | Tetrachlorohydroquinone dibenzoate | 1.0 | 0.8 | 270 | 52.3 | 3.73 | 97.0 | 1.1 | 1.9 |

[1] The molar ratio to 0.04 mmol of nickel naphthenate.
[2] The molar ratio to 0.4 mmol of triethyl aluminum.

EXAMPLE 5

In a glass made reaction tube, a toluene solution of triethyl aluminum (4 mmol) and benzotrifluoride (3 mmol) is heated at a temperature around the boiling point of toluene for 30 minutes to make a volume of 20 ml. A solution of 1,3-butadiene (2.4 g.) in toluene (76 ml.) and a solution of nickel naphthenate (0.4 mmol) in toluene (4 ml.) are added thereto in this order, and the resulting mixture is stirred at 25° C. for 30 minutes. A part of the mixture (10 ml.) is taken out and charged obtained catalyst composition are carried out in the same manner as in Example 2 except that the amounts of nickel naphthenate, triethyl aluminum and benzotrifluoride are changed respectively to 0.04 mmol, 0.4 mmol and 0.4 mmol, trifluoroacetic acid (0.04 mmol) is used as the component (D) and the aging of the catalyst composition is performed at 50° C. for 15 minutes.

The results are shown in Table 8 with variation of the amount of water added.

TABLE 8

| Number | Molar ratio of water to triethyl aluminum | Polymerization time (min.) | Polymerization product | | | | |
|---|---|---|---|---|---|---|---|
| | | | Yield (percent) | [η] (dl./g.) | Micro structure (percent) | | |
| | | | | | Cis-1,4 | Trans-1,4 | 1,2 |
| 1 | 0.6/0.4 | 150 | 75.4 | 2.68 | 96.3 | 1.3 | 2.4 |
| 2 | 0.8/0.4 | 150 | 81.5 | 3.10 | 96.5 | 1.3 | 2.2 |
| 3 | 1.0/0.4 | 240 | 63.3 | 3.45 | 96.4 | 1.3 | 2.3 |
| 4 | 1.2/0.4 | 480 | 59.8 | 3.69 | 96.5 | 1.3 | 2.2 |

EXAMPLE 7

The preparation of a catalyst composition and the polymerization of 1,3-butadiene are carried out in the same manner as in Example 6 except that trifluoroacetic acid is replaced by tetrachlorohydroquinone diacetate.

The results are shown in Table 9.

TABLE 9

| Number | Molar ratio of water to triethyl aluminum | Polymerization time (min.) | Polymerization product | | | | |
|---|---|---|---|---|---|---|---|
| | | | Yield (percent) | $[\eta]$ (dl./g.) | Micro structure (percent) | | |
| | | | | | Cis-1,4 | Trans-1,4 | 1,2 |
| 1 | 0.6/0.4 | 150 | 63.3 | 2.78 | 96.4 | 1.3 | 2.3 |
| 2 | 0.8/0.4 | 150 | 72.4 | 3.60 | 96.5 | 1.3 | 2.2 |
| 3 | 1.0/0.4 | 240 | 57.3 | 3.92 | 96.6 | 1.2 | 2.2 |
| 4[1] | 1.0/0.4 | 240 | 61.1 | 3.89 | 96.5 | 1.3 | 2.2 |
| 5 | 1.2/0.4 | 480 | 46.1 | 4.26 | 96.6 | 1.2 | 2.2 |

[1] No. 4, exceptionally using tetrachlorohydroquinone diacetate (0.02 mmol).

As shown in Tables 8 and 9, the molecular weight of the produced polymer can be controlled by the amount of water added. The microstructure of the polymer is not substantially changed depending on the amount of water added.

EXAMPLE 8

In a glass made reaction tube, a solution of triethyl aluminum (4 mmol) and benzotrifluoride (2 mmol) in toluene (20 ml.) is heated at a temperature around the boiling point of toluene for 30 minutes. A solution of 1,3-butadiene (2.4 g.) in toluene (50 ml.) and a solution of nickel naphthenate (0.4 mmol) in toluene (4 ml.) are added thereto in this order, and the resulting mixture is stirred at 25° C. for 15 minutes. Toluene (137 ml.) containing 485 p.p.m. of water is added thereto, and then a solution of trifluoroacetic acid (0.8 mmol) in toluene (16 ml.) is added. The resultant mixture is aged at 40° C. for 15 minutes.

In a 2 l. volume stainless steel made autoclave equipped with a stirrer in which the atmosphere is replaced by nitrogen, there are charged the above obtained solution, toluene (1000 ml.) and 1,3-butadiene (220 g.). The polymerization is carried out at 40° C. under stirring for 3 hours. A toluene solution of 2,6-di-t-butyl-p-cresol and isopropanol is added thereto to cease the polymerization, and the mixture is poured into a large amount of methanol. The precipitated polymer is separated and dried under reduced pressure to give 172 g. of polymer. Conversion, 78.2%.

The polymer (100 parts by weight) is admixed with stearic acid (2 parts by weight), zinc oxide (3 parts by weight), carbon black (HAF) (50 parts by weight), process oil (X-100) (5 parts by weight), N-cyclohexyl-2-benzothiazol sulfeneamide (Soxinol CZ) (1 part by weight), N-phenyl-β-naphthylamine (Antigen D) (1 part by weight) and sulfur (1.8 parts) on a roll at 50° C. The mixture is cured at 145° C. for 12 hours.

The physical properties of the cured product are shown in Table 10 in comparison with the commercially available polymers.

TABLE 10

| Physical properties | Invention product | Commercial product A | Commercial product B |
|---|---|---|---|
| Cis-1,4 content (percent) | 97.0 | 97.3 | 98.3 |
| $[\eta]$ (dl./g.) | 2.91 | 2.77 | 2.04 |
| Mooney viscosity $ML_{1+4}$ (100° C.) | 45 | 47 | 44 |
| Compound Mooney viscosity | 81 | 75 | 58 |
| Roll processability | Good | Good | [1] |
| Modulus of vulcanized product: | | | |
| $M_{200}$ (kg./cm.$^2$) | 70 | 76 | 70 |
| $M_{300}$ (kg./cm.$^2$) | 130 | 141 | 131 |
| Tensile strength (kg./cm.$^2$) | 194 | 191 | 178 |
| Elongation (percent) | 420 | 400 | 380 |
| Hardness | 66 | 65 | 62 |
| Tear strength (kg./cm.$^2$) | 55 | 49 | 44 |

[1] Not good.

What is claimed is:

1. A process for producing butadiene polymer which comprises polymerizing 1,3-butadiene in the presence of a catalyst system consisting of (A) at least one nickel compound selected from the group consisting of nickel halides, nickel sulfate, organic acid salts of nickel, complex compounds of nickel salts, organic coordination compounds of nickel and nickel chelate compounds, (B) at least one trialkyl aluminum compound, (c) at least one benzotrifluoride compound of the formula:

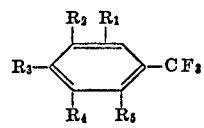

wherein $R_1$, $R_2$, $R_3$, $R_4$ and $R_5$ are each a hydrogen atom, a halogen atom, an alkyl group or a fluoroalkyl group and (D) at least one carboxylic compound selected from the group consisting of carboxylic acids of the formula:

$$R_x\text{—COOH}$$

wherein $R_x$ is a chlorinated or fluorinated alkyl group, carboxylic acid esters of the formula:

$$R_x\text{—COOR}$$

wherein R is a hydrocarbon group or a halogenated hydrocarbon group and $R_x$ is as defined above, carboxylic acid anhydrides of the formula:

$$(R_x\text{—CO})_2\text{O}$$

wherein $R_x$ is as defined above, alkylaluminum carboxylates of the formula:

$$(R_x\text{—COO})_n\text{AlR}'_{3-n}$$

wherein R' is an alkyl group, $n$ is an integer of not more than 3 and $R_x$ is as defined above and hydroquinone carboxylates of the formula:

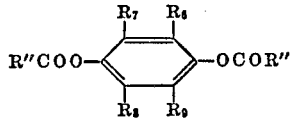

wherein $R_6$, $R_7$, $R_8$ and $R_9$ are each a hydrogen atom or a halogen atom and R" is a hydrocarbon group or a halogenated hydrocarbon group with or without (E) water to give a butadiene polymer containing predominantly a cis-1,4-structure, the molar ratios of the nickel compound to the trialkyl aluminum compound, the trialkyl aluminum compound to the benzotrifluoride compound and the carboxylic compound to the nickel compound being from 0.001 to 2, from 0.01 to 5.0 and from 0.01 to 100, respectively.

2. The process according to claim 1, wherein the nickel compound is used in an amount of 0.001 to 2 mmol based on 1 mol of monomeric 1,3-butadiene.

3. The process according to claim 1, wherein water is used in an amount of 0.05 to 1.5 mol per 1 mol of the trialkyl aluminum compound.

4. The process of claim 1, wherein polymerization is carried out by contacting 1,3-butadiene with the catalyst system in a liquid medium at a temperature from −20 to 150° C. in the presence of an inert gas.

5. The process according to claim 1, wherein the molar ratios of the nickel compound to the trialkyl aluminum compound, the trialkyl aluminum compound to the benzotrifluoride compound and the carboxylic compound to the nickel compound are from 0.01 to 1, from 0.1 to 3 and from 0.1 to 10, respectively.

6. The process according to claim 1, wherein the butadiene is contacted with the catalyst system at a temperature of from −20° to 150° C.

7. The process according to claim 6, wherein the butadiene is contacted with the catalyst system in a liquid medium.

8. The process according to claim 6, wherein the polymerization is carried out under an inert gas.

9. The process according to claim 1, wherein said nickel compound is selected from the group consisting of nickel chloride, nickel sulfate, nickel acetate, nickel naphthenate, nickel octanoate, nickel chloride-pyridine complex, tris-(dipyridyl) nickel chloride, bis(ethylenediamine)-nickel sulfate, bis-dimethylglyoxymato nickel, bis-ethylacetoacetate nickel and bis-acetylacetonate nickel.

10. The process according to claim 1, wherein said trialkyl aluminum compound is selected from the group consisting of trimethyl aluminum, triethyl aluminum, tri-n-butyl aluminum, triisobutyl aluminum and tri-n-hexyl aluminum.

11. The process according to claim 1, wherein said benzotrifluoride compound is selected from the group consisting of benzotrifluoride,
2-chlorobenzotrifluoride,
3-chlorobenzotrifluoride,
4-chlorobenzotrifluoride,
2-bromobenzotrifluoride,
3-bromobenzotrifluoride,
4-bromobenzotrifluoride,
2,5-dichlorobenzotrifluoride,
3,4-dichlorobenzotrifluoride,
2,3-dibromobenzotrifluoride,
2,5-difluorobenzotrifluoride,
3,5-difluorobenzotrifluoride,
2-methylbenzotrifluoride,
3-methylbenzotrifluoride,
4-methylbenzotrifluoride,
2-hexylbenzotrifluoride,
4-hexylbenzotrifluoride,
2-dodecylbenzotrifluoride,
4-dodecylbenzotrifluoride,
2-monofluoromethylbenzotrifluoride,
3-difluoromethylbenzo trifluoride,
1,3-bis(trifluoromethyl)benzene,
3-(3′-fluoropropyl)benzotrifluoride,
4-(2′,3′-difluoropropyl)benzotrifluoride,
1,3,5-tris(trifluoromethyl)benzene,
2-methyl-4-chlorobenzotrifluoride,
3-bromo-4-ethylbenzotrifluoride,
2-methyl-4-trifluoromethylbenzotrifluoride, and
3-fluoro-4-trifluoromethylbenzotrifluoride.

12. The process according to claim 1, wherein the carboxylic acid is selected from the group consisting of trichloroacetic acid,
difluoroacetic acid,
2,2,3,3-tetrafluoropropionic acid,
2,2,3,3,4,4,5,5-octafluoro-n-valeric acid,
2,2,3,3,4,4,5,5,6,6,7,7-dodecafluoroheptanoic acid
trifluoroacetic acid,
perfluoropropionic acid,
perfluoro-n-butyric acid,
perfluoroisobutyric acid,
perfluoro-n-valeric acid,
perfluorocaproic acid,
perfluoroheptanoic acid, and
perfluorocapric acid.

13. The process according to claim 1, wherein component (A) is nickel napthenate, component (B) is triethyl aluminum and component (C) is benzotrifluoride or 3-chlorobenzotrifluoride.

References Cited
UNITED STATES PATENTS

| | | | |
|---|---|---|---|
| 3,649,605 | 3/1972 | Throckmorton | 260—94.3 X |
| 3,681,314 | 8/1972 | Yagi et al. | 260—94.3 |
| 3,681,315 | 8/1972 | Yagi et al. | 260—94.3 |
| 3,684,789 | 8/1972 | Yagi et al. | 260—94.3 |

JOSEPH L. SCHOFER, Primary Examiner

W. F. HAMROCK, Assistant Examiner